United States Patent [19]
Inagaki

[11] Patent Number: 5,936,755
[45] Date of Patent: Aug. 10, 1999

[54] MULTI-BEAM SCANNING APPARATUS

[75] Inventor: Yoshihiro Inagaki, Toyokawa, Japan

[73] Assignee: Minolta Co., Ltd., Osaka, Japan

[21] Appl. No.: 09/008,375

[22] Filed: Jan. 16, 1998

[30] Foreign Application Priority Data

Jan. 17, 1997 [JP] Japan ................................. 9-006325

[51] Int. Cl.$^6$ .................................................. G02B 26/08
[52] U.S. Cl. .................. 359/204; 359/201; 359/212; 347/137; 347/243
[58] Field of Search ................................... 359/196, 197, 359/201, 204, 212, 216, 217, 218, 219; 347/131, 134, 135, 137, 233, 243

[56] References Cited

U.S. PATENT DOCUMENTS

| 4,390,235 | 6/1983 | Minoura | 350/6.1 |
| 4,393,387 | 7/1983 | Kitamura | 346/108 |
| 5,002,375 | 3/1991 | Komplin et al. | 359/641 |
| 5,469,290 | 11/1995 | Maeda | 359/204 |

FOREIGN PATENT DOCUMENTS

| 56-104315 | 8/1981 | Japan . |
| 57-54914 | 4/1982 | Japan . |
| 58-068016 | 4/1983 | Japan . |

*Primary Examiner*—Cassandra Spyrou
*Assistant Examiner*—Darren E. Schuberg
*Attorney, Agent, or Firm*—Sidley & Austin

[57] ABSTRACT

A multi-beam scanning optical apparatus of the present invention which is a multi-beam scanning apparatus which forms an image on a scanned surface via a plurality of laser beams, the laser scanning device has, a light source emitting a plurality of laser beams, a modulation device capable of switching the respective modulation frequencies of the laser beams, a deflection device deflecting the laser beams, capable of switching the scanning cycle of the laser beams, an axially symmetric optical system changing the distance among the laser beams on the scanned surface relative to a direction perpendicular to both an optical axis of the laser beams and a scanning direction by inserting itself into the optical path of the laser beams and a moving device inserting said axially symmetric optical system into the optical path.

20 Claims, 8 Drawing Sheets

MULTI-BEAM SCANNING APPARATUS

This application is based on application No. H9-6325 filed in Japan, the contents of which is hereby incorporated by reference.

BACKGROUND OF THE INVENTION

1. Field of the Invention

The present invention relates to a multi-beam scanning apparatus, and more specifically relates to a multi-beam scanning apparatus capable of changing resolution.

2. Description of the Related Art

Japanese Laid-Open Patent Application Nos. 57-54914 and 58-68016, for example, disclose the art to change resolution in a multi-beam scanning apparatus that forms an image on a scanned surface via a plurality of laser beams.

In the multi-beam scanning apparatus disclosed in Japanese Laid-Open Patent Application No. 58-68016, resolution is switched by providing components to change the advance direction of the luminous flux in an optical path before laser beams are overlaid, and changing the beam spacing in a subscan direction on a scanned surface via said components. In the multi-beam scanning apparatus disclosed in Japanese Laid-Open Patent Application No. 57-54914, resolution is switched by providing an afocal anamorphic zoom lens system to change the image forming magnification in a subscan direction, and changing the beam spacing in a subscan direction on a scanned surface via said zoom lens system.

In the multi-beam scanning apparatus of Japanese Laid-Open Patent Application No. 58-68016, a mechanism is required to switch the resolution before the laser beams are overlaid on the optical path. Therefore, disadvantages arise inasmuch as the number of components is increased and the optical system before the laser beams are overlaid is more complex, and maintaining the relative position accuracy of the beams becomes more difficult due to the increase in relative displacement error of the beam positions resulting from said increased complexity. A further disadvantage arises in increased cost associated with, for example, the requirement for a relative position adjustment mechanism via feedback control.

Consider a method which uses a light source to generate a plurality of laser beams rather than overlaying laser beams to form a plurality of light sources as one method of realizing image formation via a plurality of laser beams. In this instance, the light emission point spacing must be on the order of several microns to have the convergence position spacing on the scanned surface of either 1 dot or several dots. Each laser beam must be quickly overlaid directly after the light source. Therefore, the art proposed in Japanese Laid-Open Patent Application No. 58-68016 is not applicable to laser scanning apparatuses using a light source to emit a plurality of laser beams.

In the laser scanning apparatus disclosed in Japanese Laid-Open Patent Application No. 57-54914, a plurality of anamorphic lenses are required to construct the aforesaid afocal anamorphic zoom lens system, and this arrangement disadvantageously necessitates rotational adjustment around the optical axes of said lenses. A minimum of at least three lenses is required to accomplish variable magnification without defocusing, and since said lenses must be individually moved to maintain their respective optical axis, the construction is therefore disadvantageously complicated. Furthermore, the laser beam diameter must be changed to switch resolution, therefore requiring a separate mechanism to change said beam diameter in addition to a mechanism to change the relative position.

OBJECTS AND SUMMARY

An object of the present invention is to provide a multi-beam scanning apparatus with a high beam relative position accuracy and simple construction.

An another object of the present invention is to provide a multi-beam scanning apparatus capable of the resolution of the image on the scanned surface via a simple construction.

These objects are attained by a multi-beam scanning apparatus of the present invention which is a multi-beam scanning apparatus which forms an image on a scanned surface via a plurality of laser beams, said apparatus comprising: a light source emitting a plurality of laser beams, a modulation device capable of switching the respective modulation frequencies of said laser beams, a deflection device deflecting said laser beams, capable of switching the scanning cycle of said laser beams, an axially symmetric optical system for changing the distance among said laser beams on a scanned surface relative to a direction perpendicular to both an optical axis of the laser beams and a scanning direction by being inserted into the optical path of said laser beams, and a moving device for inserting said axially symmetric optical system into the optical path.

These and other object, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
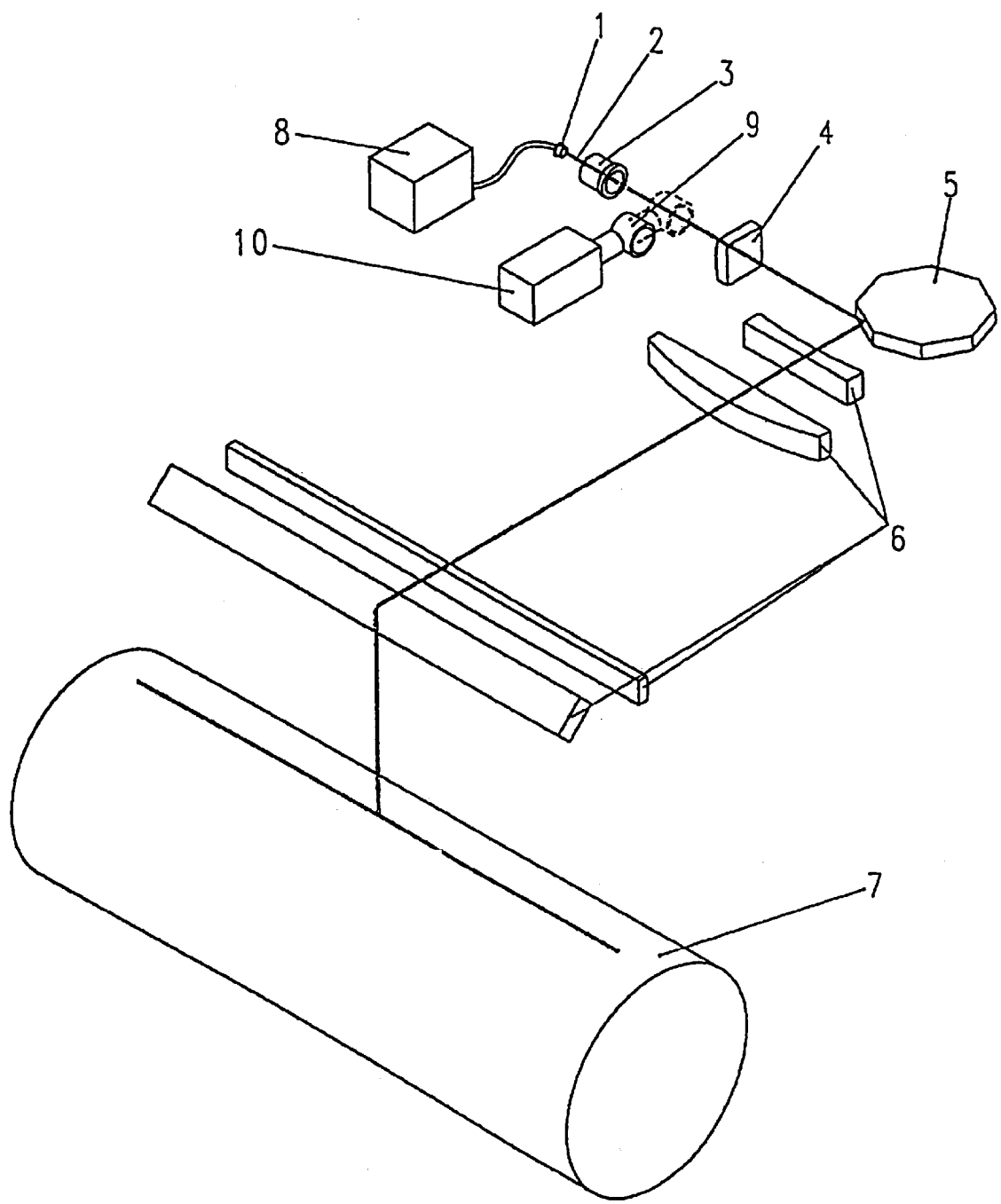
FIG. 1 is a perspective view of a first embodiment of a laser scanning apparatus.
Figure 5:
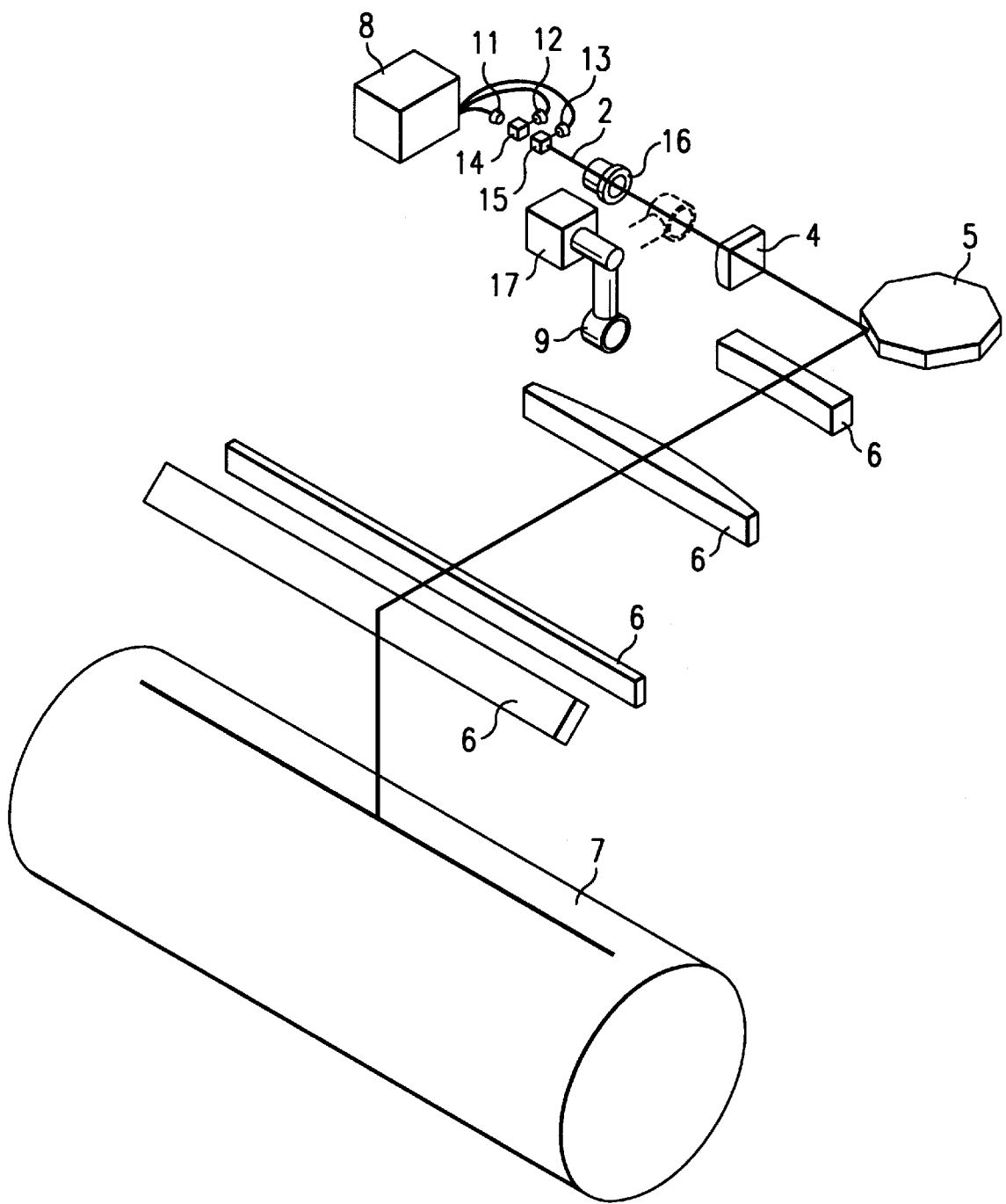
FIG. 5 is a perspective view of a second embodiment of the laser scanning apparatus.

The preferred embodiments of the present invention are described hereinafter with reference to the accompanying drawings. FIG. 1 is a perspective view of a first embodiment of a laser scanning apparatus; FIG. 5 is a perspective view of a second embodiment of a laser scanning apparatus. Both laser scanning apparatuses are multi-beam scanning apparatuses which form an image on a scanned surface, i.e., the surface of photosensitive member 7, via a plurality of laser beams 2. Resolution is switchable between 600 dpi and 300 dpi in the first embodiment, and between 600 dpi and 400 dpi in the second embodiment. Identical or equivalent parts in both embodiments are identified by like reference numbers.

First Embodiment (FIGS. 1–4)

As shown in FIG. 1, the laser scanning apparatus of the first embodiment comprises a light source 1 capable of emitted two laser beams 2, modulation device 8, polygonal mirror 5 to deflect said laser beams 2, dpi-switching lens unit 9, linear actuator 10, and scanning lens unit 6 provided with a reflective mirror on the exit side. Provided between said light source 1 and said polygonal mirror 5 are collimator lens 3 to collimate laser beams 2 and cylindrical lens 4 to condense only laser beams 2 in a subscan direction disposed near the polygonal reflecting surface.

Modulator 8 is constructed so as to be capable of switching the respective modulation frequencies of said laser beams 2, and polygonal mirror 5 is constructed so as to be capable of switching the scanning cycle of said laser beams 2. The dpi-switching lens unit 9 comprises an axially symmetric optical system which changes the spacing at which the laser beams 2 are condensed on the surface of a photosensitive member 7 by inserting said lens unit 9 into the optical path of laser beams 2 before said beams reach the polygonal mirror 5 (i.e., between collimator lens 3 and cylindrical lens 4) such that the entirety of said laser beams 2 enter lens unit 9. Linear actuator 10 is a moving means which freely inserts dpi-switching lens unit 9 into said optical path.

When resolution is set at 600 dpi, two laser beams 2 are emitted from light source 1 and collimated by collimator lens 3, and subsequently enter cylindrical lens 4. Laser beams 2 are condensed once only in the subscan direction on the polygon reflecting surface via cylindrical lens 4, and are deflected by polygonal mirror 5. Laser beams 2 deflected by polygonal mirror 5 are refracted and reflected by scanning lens unit 6, and form an image (electrostatic latent) image on the surface of photosensitive member 7 by condensing and moving at equal speed on said scanned surface 7 in the main scan and subscan directions.

Light source 1 emits laser beams 2 from two slightly separates (12.7 $\mu$m) emission points. Each laser beam 2 is individually modulated by modulator 8. The two laser beams 2 are condensed at positions separated on the surface of photosensitive member 7 in the main scan direction by a distance equivalent to 3 dots (127 $\mu$m at 600 dpi).

When resolution is set at 300 dpi, the modulation frequencies of modulator 8 and the rotational speed of polygonal mirror 5 are switched, and the dpi-switching lens unit 9 is inserted between collimator lens 3 and cylindrical lens 4. The movement of dpi-switching unit 9 is accomplished mechanically via linear actuator 10. When dpi-switching unit 9 is inserted into the optical path, the resolution is switched from 600 dpi to 300 dpi.

The construction data of axially symmetric optical system built into dpi-switching lens unit 9 and other optical data are described below. Among construction data, Si (i=1,2,3,4) is the No. i surface counting from the light source side, ri (i=1,2,3,4) is the paraxial curvature radius of surface Si, di (i=1,2,3,4) is the axial distance (spacing) of surface No. i counting from the light source side, and Ni (i=1,2) is the refractive index of No. i lens counting from the light source side relative to a laser beam of wavelength 780 nm.

| SURFACE | RADIUS OF CURVATURE | AXIAL DISTANCE | REFRACTIVE INDEX |
|---|---|---|---|
| Incident side | | | |
| S1 | r1 = 61.3416 | | |
| | | d1 = 4.000 | N1 = 1.51118 |
| S2 | r2 = ∞ | | |
| | | d2 = 55.37 | |
| S3 | r3 = ∞ | | |
| | | d3 = 3.000 | N2 = 1.51118 |
| S4 | r4 = 30.6708 | | |
| Exit side | | | |
| A Focal Length of Collimator Lens 3 = 15 | | | |
| A Focal Length of Cylindrical Lens 4 = 200 | | | |
| A Focal Length of Scanning Lens Unit 6 (Main Scan Direction) = 270 | | | |
| A Focal Length of Scanning Lens Unit 6 (Subscan Direction) = 110 | | | |

In the first embodiment, the axially symmetric optical system built into the dpi-switching lens unit 9 is an afocal lens. The collimation of the laser beams 2 entering the cylindrical lens 4 does not change when dpi-switching lens unit 9 is retracted from the optical path or when said lens unit 9 is inserted into the optical path. Accordingly, the position in the axial direction of dpi-switching lens unit 9 relative to cylindrical lens 4 does not affect optical performance. That is, there is no reduction in optical efficiency, e.g., defocusing or the like, even when the axially symmetric optical system is inserted into the optical path.

Figure 2:
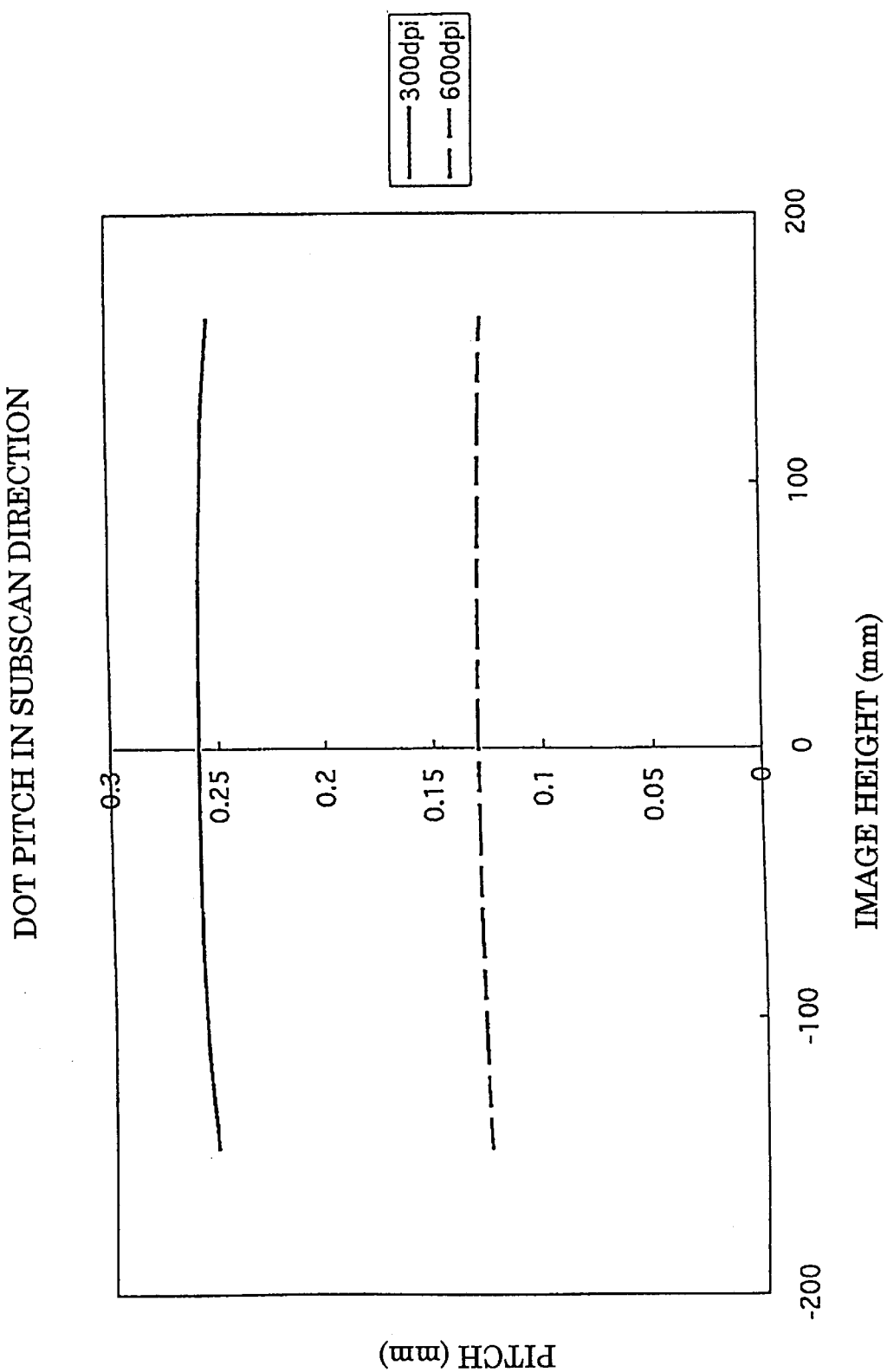
FIG. 2 is a graph showing the beam spacing in the subscan direction on a photosensitive member in said first embodiment.

FIG. 2 is a graph showing the beam spacing of the laser beams 2 in the subscan direction (subscan pitch) on the surface of the photosensitive member 7 when dpi-switching lens unit 9 is retracted from the optical path (resolution: 600 dpi) and when dpi-switching lens unit 9 is inserted into the optical path (resolution: 300 dpi). The distance equivalent to 1 dot is 85 $\mu$m at 300 dpi, and 42 $\mu$m at 600 dpi. Therefore, it is understood that the spacing of the two laser beams 2 is equal to a distance corresponding to three dots.

The modulation frequency and rotational speed of polygonal mirror 5 at each resolution is described below.

| RESOLUTION [DPI] | 600 | 300 |
|---|---|---|
| ROTATIONAL SPEED [RPM] | 17717 | 8858 |
| MODULATION FREQUENCY [HZ] | 23.65 | 5.91 |

In the first embodiment, when switching resolution from 600 dpi to 300 dpi the resolution is set to ½ not only in the subscan direction but also in the main scan direction. Therefore, the rotational speed of the polygonal mirror 5 is set at ½, and the modulation is set at ¼. In general, when the resolution in the main scan direction is designated magnification a and the resolution in the subscan direction is designated magnification b, the rotational speed of the polygonal mirror 5 is set at magnification b, and the modulation frequency is set at magnification (a×b).

Figure 3A:
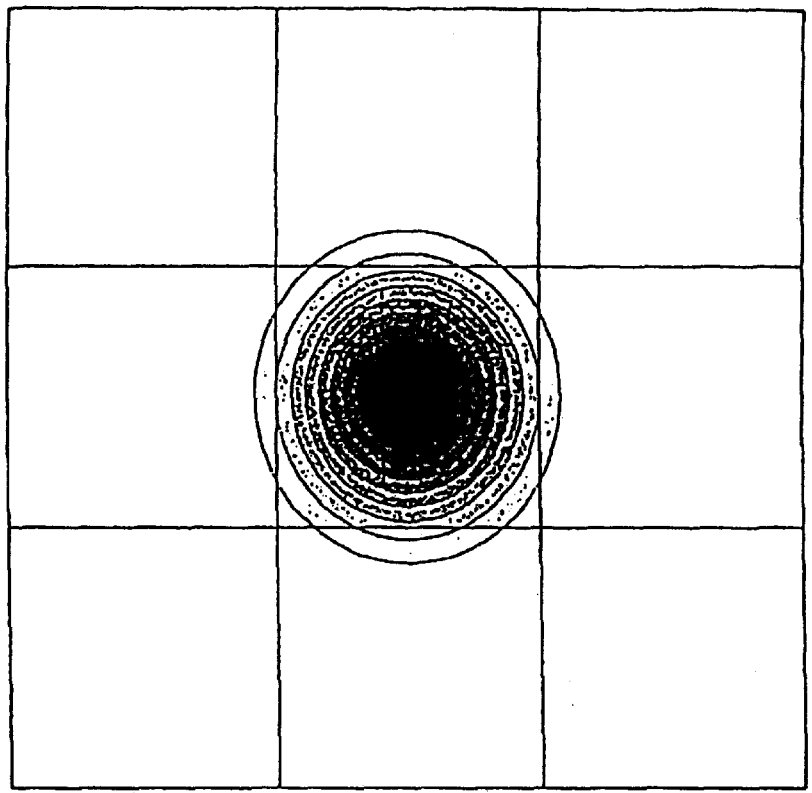
FIGS. 3(A) and 3(B) show the beam shape on a photosensitive member in said first embodiment.
Figure 3B:
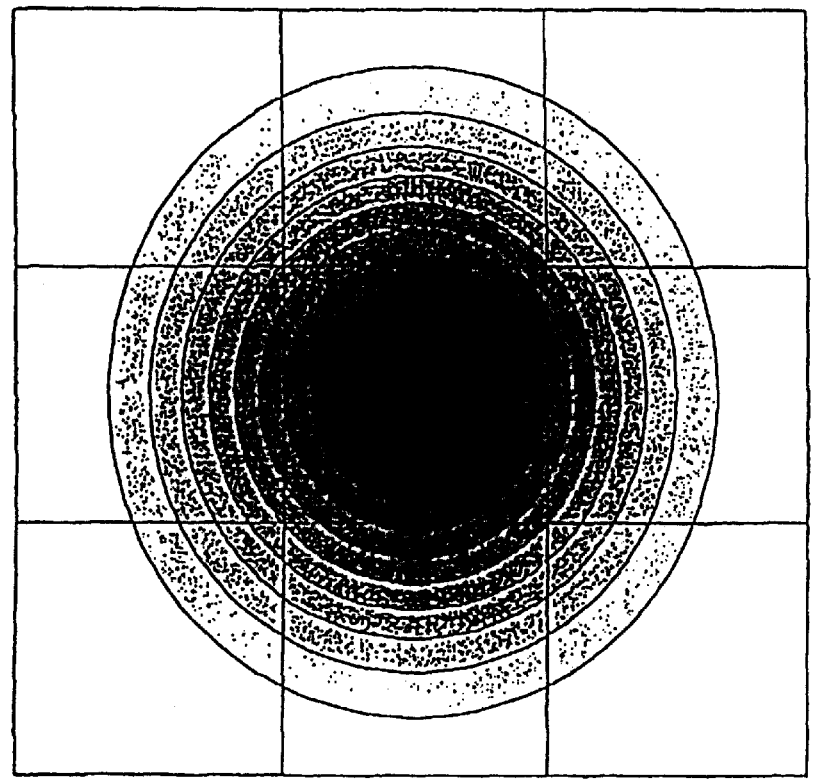

FIGS. 3(A) and 3(B) show the shape (i.e., a cross section perpendicular to the optical axis) of one laser beam 2 on the surface of photosensitive member 7; variable density in the drawing indicates the light intensity distribution of the laser beam 2. FIG. 3(A) shows the beam shape when dpi-switching lens unit 9 is retracted from the optical path (resolution: 600 dpi), and FIG. 3(B) shows the beam shape when dpi-switching lens unit 9 is inserted into the optical path (resolution: 300 dpi).

FIGS. 3(A) and 3(B) show the light intensity distribution at a region representing 10% relative to a peak intensity level, the white area is the range of 0–10% of a peak level, and the darkest area at the center is the range of 90–100% of a peak level. In the drawing, the lateral direction represents the subscan direction, and the vertical direction represents the main scan direction.

Scales in FIGS. 3(A) and FIG. 3(B) are identical; one square of the lattice is equivalent to one dot at a resolution of 600 dpi, and four squares of the lattice are equivalent to one dot at a resolution of 300 dpi. From comparison of FIGS. 3(A) and 3(B) it can be understood that the beam diameter is twice as large in both the subscan direction and main scan direction in FIG. 3(B). Therefore, optimum beam diameter is obtained at each resolution without providing a beam diameter adjustment mechanism.

Figure 4A:
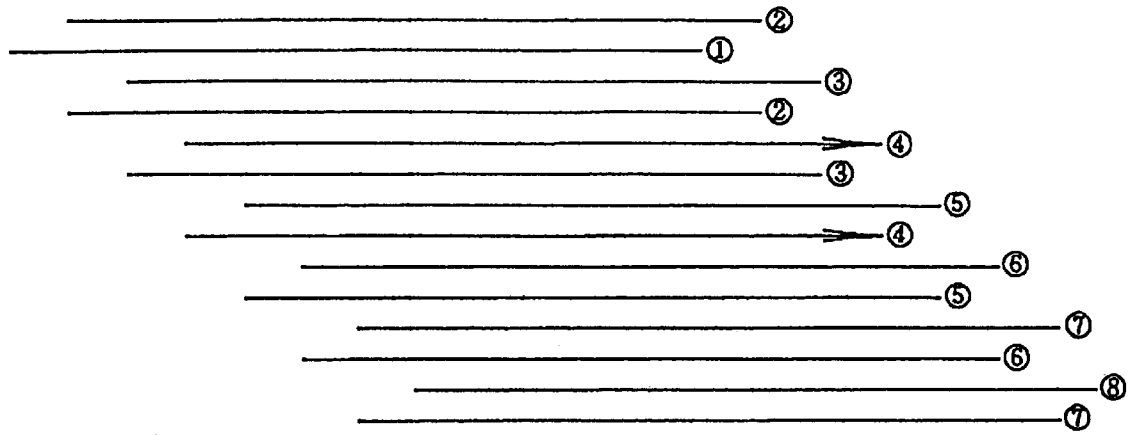
FIGS. 4(A) and 4(B) show the mode of writing in said first embodiment.
Figure 4B:
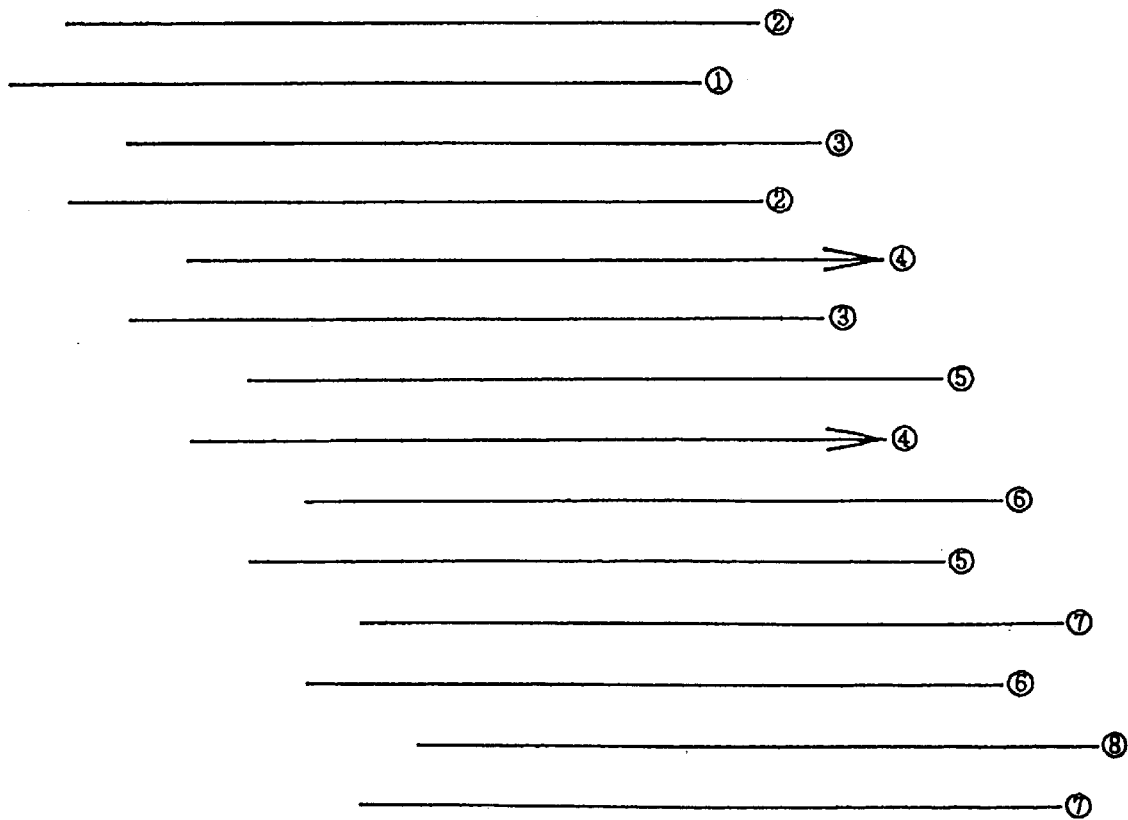

FIGS. 4(A) and 4(B) illustrate an image drawn on the surface of photosensitive member 7. FIG. 4(A) shows an image drawn when the dpi-switching lens unit 9 is retracted from the optical path (resolution: 600 dpi), and FIG. 4(B) shows an image drawing when the dpi-switching lens unit 9 is inserted into the optical path (resolution: 300 dpi). Actually, the image positions in the main scan direction are all the same, but to easily discriminate the lines written by each scan, two lines (indicated by the same reference numbers in FIG. 4) drawn in a single scan are at the same positions in the horizontal direction (main scan direction), and the line drawn in the subsequent scan is shifted slightly to the right. For example, the two lines drawn in the fourth scan are designated (4) in 4(A) and 4(B).

Since photosensitive member 7 is rotated between each scan, the writing position of the next scan is shifted in the subscan direction (vertical direction). Although the rotational speed of photosensitive member 7 does not change even when the resolution is switched, the time required for one scan varies because the rotational speed of polygonal mirror 5 changes. Therefore, a comparison of FIGS. 4(A) and 4(B) reveals that the amount of shift in the writing positions also changes in the subscan direction.

The writing position moves in the subscan direction in an amount equivalent to 2 dots at each resolution. Furthermore, the spacing of two lines written in one scan is an amount equivalent to 3 dots at each resolution. Therefore, a gap opens in the image written in a single scan, but as can be understood from FIGS. 4(A) and 4(B), as scanning is repeated the line written in a previous scan and the line written in a subsequent scan become a single line which is positioned on the aforesaid gap, such that no gap appears.

According to the construction of the first embodiment as described above, resolution is switched by inserting a dpi-switching lens unit 9 into the optical path before the two laser beams 2 are overlaid, thereby avoiding the disadvantage of increasing the number of parts and complexity of the optical system before beam overlay, and avoiding the need for a mechanism to achieve said overlay as shown in FIG. 1. Accordingly, relative position precision of the beams is quite high. Furthermore, since beam position variation due to manufacturing errors and the like occur simultaneously for each said beam, there is no variation in the relative positions of the two laser beams 2. Therefore, a relatively low accuracy is required of the dpi-switching mechanism comprising unit 9, linear actuator 10 and the like.

Since the optical system using the dpi-switching lens unit 9 is axially symmetrical, rotation adjustment around the optical axis is unnecessary. Furthermore, since only a single lens unit 9 is moved, the moving mechanism is simple compared to zoom variable magnification. Moreover, the absence of zoom magnification allows the number of lenses required in the dpi-switching mechanism to be reduced in practice to two lenses (and theoretically only one). A further advantage is the omission of a mechanism to change the beam diameter as previously mentioned because the beam diameter changes as the spacing changes for the focus position on the surface of photosensitive member 7 via the qualities of the optical system.

Second Embodiment (FIGS. 5–8)

As shown in FIG. 5, the laser scanning apparatus of the second embodiment comprises three light sources 11, 12, 13 which each emit a single laser beam 2, modulation device 8, two beam splitters 14 and 15, polygonal mirror 5 to deflect laser beam 2, dpi-switching lens unit 9, motor 17, and scanning lens unit 6 having a reflecting mirror on the exit side. Provided between said light sources 11–13 and the polygonal mirror 5 are a condensing lens 16 to condense laser beam 2, and cylindrical lens 4 to condense laser beam 2 only in the subscan direction and disposed near the polygonal reflecting surface.

Modulator 8 is constructed so as to be capable of switching the modulation frequencies of the respective laser beams 2, and polygonal mirror 5 is constructed so as to be capable of switching the scan cycle of the laser beams 2. Beam splitters 14 and 15 are an overlay means to overlay said laser beams 2 so as to advance the three laser beams 2 in virtually the same optical path, and condense said beams 2 at positions separated only by predetermined minute distances in the subscan direction on the surface of photosensitive member 7. The dpi-switching lens unit 9 comprises an axially symmetric optical system which changes the spacing for condensing the three laser beams 2 in the subscan direction by inserting said unit 9 into the optical path after the laser beams 2 are overlaid by beam splitters 14 and 15 until arriving at polygonal mirror 5 (i.e., between condensing lens 16 and cylindrical lens 4) so as to have the entirety of said laser beams 2 enter unit 9. Motor 17 is a moving means to freely insert dpi-switching lens unit 9 into said optical path.

When the resolution is set at 600 dpi, the three laser beams 2 emitted from the three light sources 11–13 are overlaid by the two beam splitters 14 and 15, and subsequently enter condensing lens 16 and are condensed, then enter cylindrical lens 4. Laser beams 2 are condensed in the subscan direction on the polygon reflecting surface via cylindrical lens 4, and are deflected and reflected by polygonal mirror 5. The laser beams 2 deflected by polygonal mirror 5 are refracted and reflected by scanning lens unit 6, and condensed on the surface of photosensitive member 7 in the main scan direction and subscan direction, and form an image (electrostatic latent image) on the surface of photosensitive member 7 by moving at equal speed on the surface of photosensitive member 7.

The positions of the three light sources 11, 12, 13 are adjusted to condense each laser beam 2 at positions separated in the subscan direction by a distance equivalent to 1 dot (e.g., 42 $\mu$m at a resolution of 600 dpi) on the surface of photosensitive member 7. The laser beams 2 are modulated individually by modulator 8 in the same manner as in the first embodiment.

When the resolution is set at 300 dpi, the modulation frequency of modulator 8 and the rotational speed of polygonal mirror 5 are switched, and the dpi-switching lens unit 9 is inserted between condensing lens 16 and cylindrical lens 4. The movement of dpi-switching lens unit 9 is accomplished by motor 17. That is, dpi-switching lens unit 9 is mounted on the tip of an arm attached to motor 17, such that dpi-switched lens unit 9 is inserted into the optical path via the rotation of motor 17. When the dpi-switching lens unit 9 is inserted into the optical path, the resolution is switched from 600 dpi to 300 dpi.

The construction data of axially symmetric optical system built into dpi-switching lens unit 9 and other optical data are described below. Among construction data, Si (i=1,2,3,4) is the No. i surface counting from the light sources 11–13 side, ri (i=1,2,3,4) is the paraxial curvature radius of surface Si, di (i=1,2,3,4) is the axial distance (spacing) of surface No. i counting from the light sources 11–13 side, and Ni (i=1,2) is the refractive index of No. i lens counting from the light sources 11–13 side relative to a laser beam of wavelength 780 nm. The surface shape of axially symmetric aspherical lens surfaces S1 and S4 are defined by equation (AS) below using the coordinates (X,Y,Z) of the lens surface points as origin points.

$$X = \frac{c \cdot (Y^2 + Z^2)}{1 + \sqrt{1 - \varepsilon \cdot c^2 \cdot (Y^2 + Z^2)}} + \sum_{i=4}^{10} (ai) \cdot (Y^2 + Z^2)^{i/2} \quad \text{(AS)}$$

Where,
X: coordinate in the optical axis direction
Y: coordinate in the main scan direction
Z: coordinate in the subscan direction
c: paraxial curvature;
$\varepsilon$: quadric surface parameter; and
ai: ith aspherical surface coefficient.

| SURFACE | RADIUS OF CURVATURE | AXIAL DISTANCE | REFRACTIVE INDEX |
|---|---|---|---|
| Incident side | | | |
| S1 | r1 = 20.4472 | | |
| | | d1 = 4.000 | N1 = 1.51118 |
| S2 | r2 = ∞ | | |
| | | d2 = 7.81 | |
| S3 | r3 = ∞ | | |
| | | d3 = 4.000 | N2 = 1.51118 |
| S4 | r4 = 12.7692 | | |
| Exit side | | | |

[Quadric Surface Parameter $\varepsilon$ and Aspherical Surface coefficient ai of Axially Symmetric Aspherical Surface S1]
$\varepsilon$=1
a4=−7.73518×10$^{-6}$
a6=−1.49996×10$^{-8}$
a8=−2.11969×10$^{-11}$
a10=−7.86135×10$^{-14}$

[Quadric Surface Parameter $\varepsilon$ and Aspherical Surface coefficient ai of Axially Symmetric Aspherical Surface S1]
$\varepsilon$=1
a4=−3.44701×10$^{-5}$
a6=−1.69075×10$^{-7}$
a8=−4.60179×10$^{-10}$
a10=−6.71232×10$^{-12}$ A Distance Between Surface S1 and Position of Natural Convergence Point=447.38
A Focal Length of Condensing Lens 16=16
A Focal Length of Cylindrical Lens 4=130
A Focal Length of Scanning Lens Unit 6
(Main Scan Direction)=−4000
A Focal Length of Scanning Lens Unit 6
(Subscan Direction0=78

In the second embodiment, the axially symmetric optical system built into dpi-switching lens unit 9 is a lens unit comprising one each of an axially symmetrical convex lens and concave lens. When incident light (converged light) is condensed at the position of the aforesaid natural convergence point, the exit light is condensed at an identical position in the optical axis direction. At this time, the axially symmetric optical system built into the dpi-switching lens unit 9 satisfies conditional equation (1) below. Satisfying this conditional equation (1) before and after insertion of dpi-switching lens unit 9 is effective in not changing the image position in the optical axis direction. That is, the image position will change if the dpi-switching lens unit 9 is not designed so as to satisfy the conditional equation (1).

$$t = \frac{x\left(x + 2f1 - \sqrt{(x + 2f1)^2 - 4(x + f1)(f1 + f2)}\right)}{2(x + f1)} \quad (1)$$

Where the following definitions obtain:
$f1$: focal length of No. 1 lens from the light source side in the axially symmetric optical system, $f2$: focal length of the No. 2 lens from the light source side in the axially symmetric optical system, x: distance from the anterior principal point of the No. 1 lens from the light source side to the natural convergence point of the converged light in the axially symmetric optical system, t: distance from the posterior principal point of the No. 1 lens from the light source side to the anterior principal point of the No.2 lens in the axially symmetric optical system.

Relational data of conditional equation 1 is described below.
$f1$=40
$f2$=−25
x=447.38
t=13.10

In the second embodiment, dpi-switching lens unit 9 has a compact design to reduce the spacing of the two lenses. When the two lenses are constructed as spherical lenses, for example, the spherical aberration is excessively increased such that the beams cannot be condensed on the surface of photosensitive member 7. Having each lens designed as an aspherical lens minimizes aspherical aberration. Since the aforesaid conditional equation (1) stipulates only conditions in the near axial region, aspherical surfaces alone, or aspherical surfaces may be used. In the second embodiment, the focal length of the scanning lens unit 6 in the main scan direction is negative, the laser beams 2 are condensed on the surface of photosensitive member 7 although the focal length is negative because the laser beams 2 entering the scanning lens unit 6 is converged light.

Figure 6:
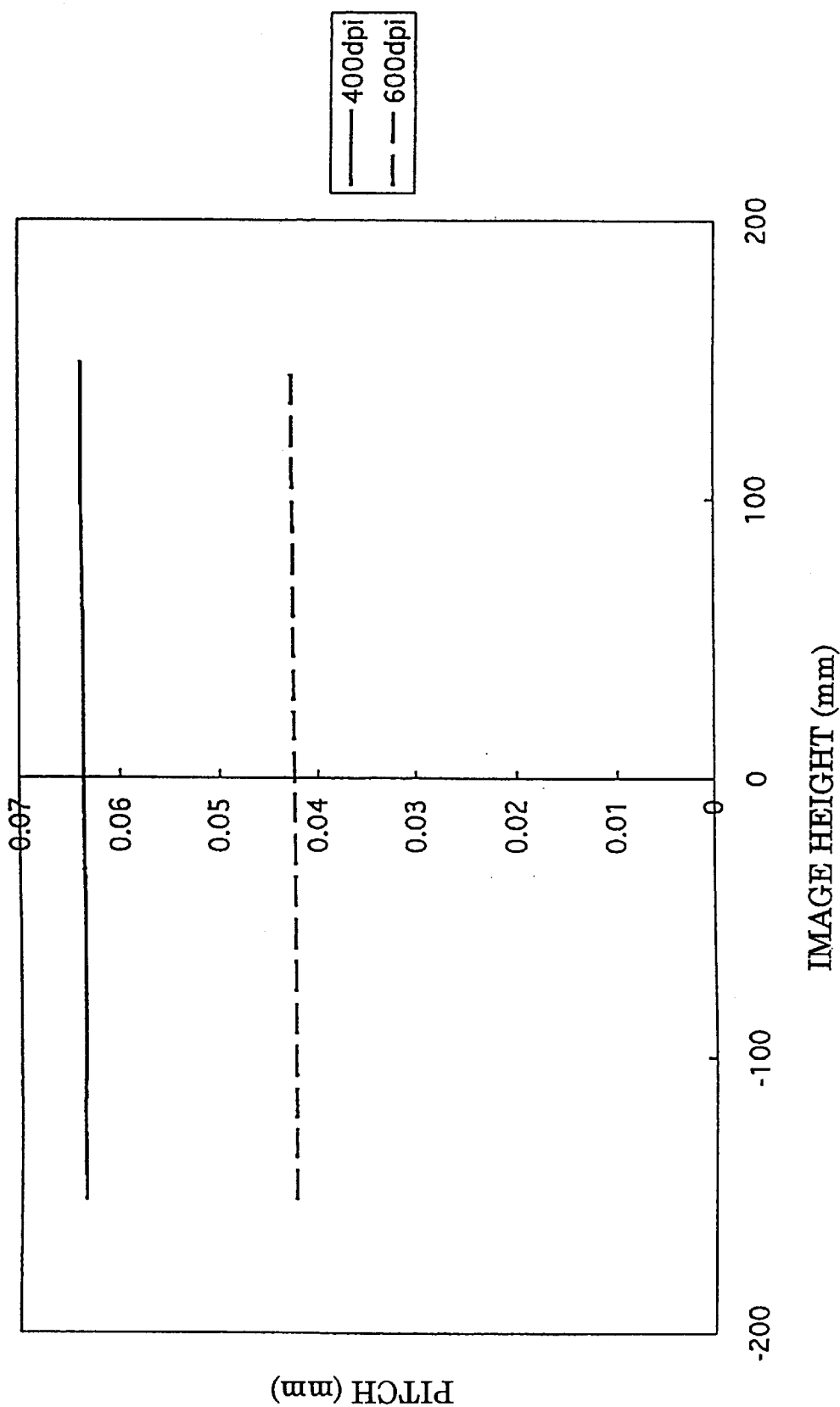
FIG. 6 is a graph showing the beam spacing in the subscan direction on a photosensitive member in said second embodiment.

FIG. 6 is a graph showing the beam spacing of two adjacent laser beams 2 in the subscan direction (subscan pitch) on the surface of the photosensitive member 7 when dpi-switching lens unit 9 is retracted from the optical path (resolution: 600 dpi) and when dpi-switching lens unit 9 is inserted into the optical path (resolution: 400 dpi). The two adjacent laser beams 2 are two groups, and the same effect is obtained whichever group is selected. The distance equivalent to 1 dot is 64 $\mu$m at 400 dpi, and 42 $\mu$m at 600 dpi. Therefore, it is understood that the spacing of the two laser beams 2 is equal to a distance corresponding to one dot.

The modulation frequency and rotational speed of polygonal mirror 5 at each resolution is described below.

| RESOLUTION [DPI] | 600 | 400 |
| --- | --- | --- |
| ROTATIONAL SPEED [RPM] | 30371 | 20247 |
| MODULATION FREQUENCY [HZ] | 55.59 | 24.70 |

Figure 7A:
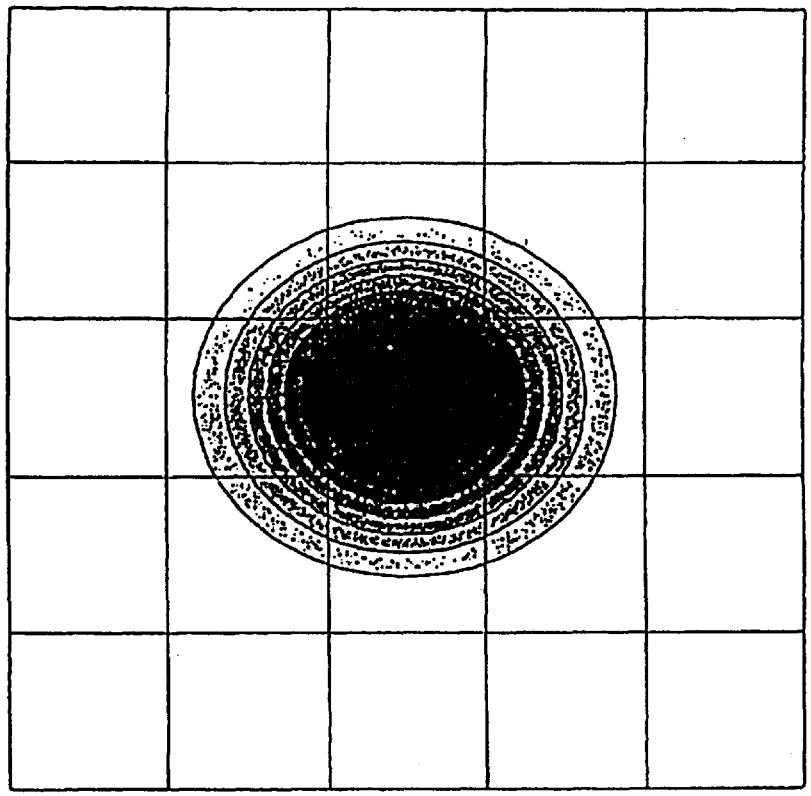
FIGS. 7(A) and 7(B) show the beam shape on a photosensitive member in said second embodiment.
Figure 7B:
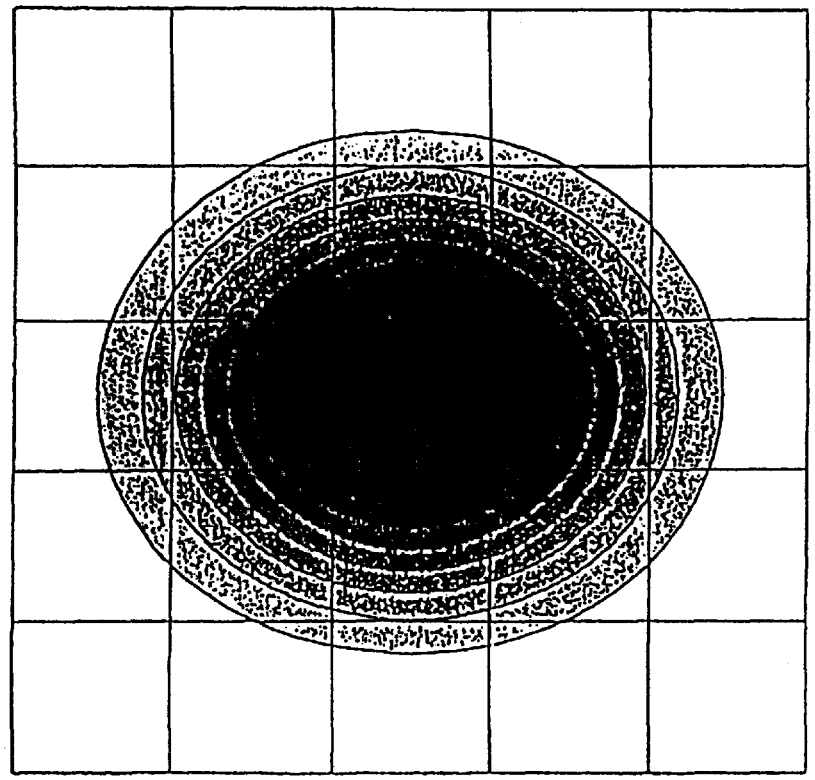

FIGS. 7(A) and 7(B) show the shape (i.e., a cross section perpendicular to the optical axis) of one laser beam 2 on the surface of photosensitive member 7; variable density in the drawing indicates the light intensity distribution of the laser beam 2 in the same manner as in FIGS. 3(A) and 3(B). FIG. 7(A) shows the beam shape when dpi-switching lens unit 9 is retracted from the optical path (resolution: 600 dpi), and FIG. 7(B) shows the beam shape when dpi-switching lens unit 9 is inserted into the optical path (resolution: 400 dpi).

Scales in FIGS. 7(A) and 7(B) are identical; the lattice size is ½ the dot pitch at 600 dpi, and four squares of the lattice are equivalent to one dot at a resolution of 600 dpi, and nine squares of the lattice are equivalent to one dot at a resolution of 400 dpi. From comparison of FIGS. 7(A) and 7(B) it can be understood that the beam diameter is 1.5 times as large in both the subscan direction and main scan direction in FIG. 7(B). Therefore, optimum beam diameter is obtained at each resolution without providing a beam diameter adjustment mechanism.

Figure 8A:
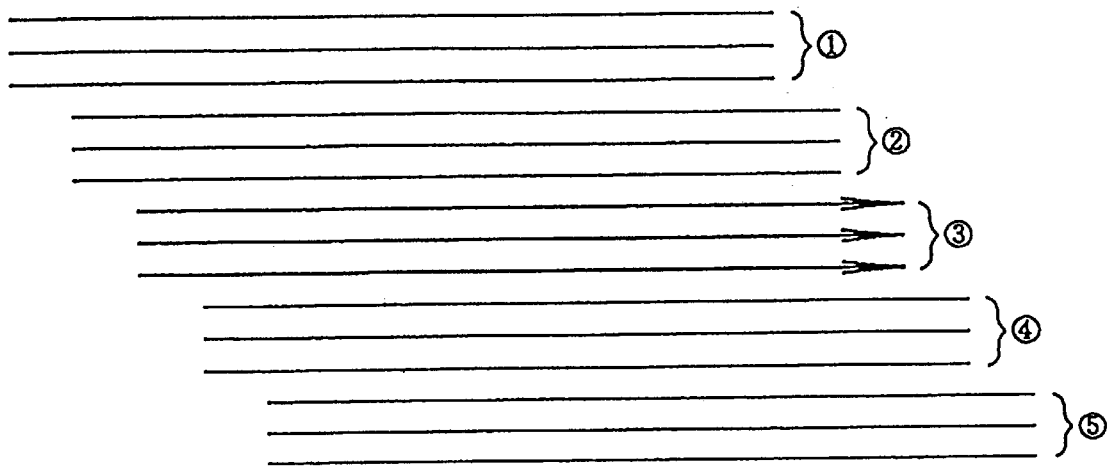
FIGS. 8(A) and 8(B) show the mode of writing in said first embodiment.
Figure 8B:
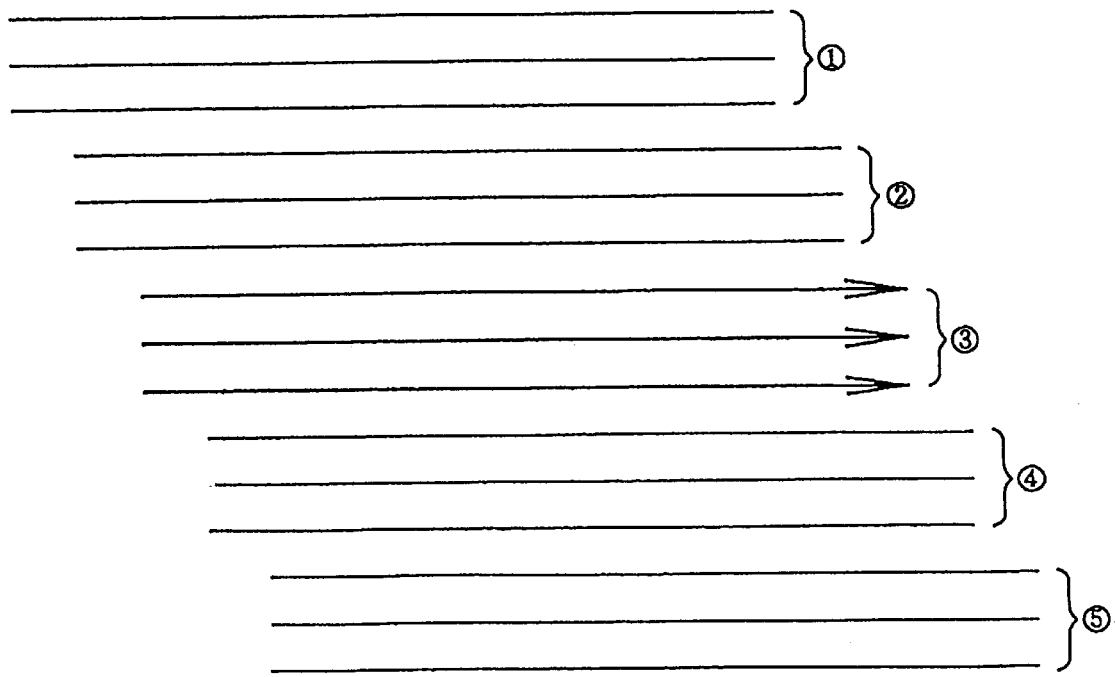

FIGS. 8(A) and 8(B) illustrate an image drawn on the surface of photosensitive member 7, similar to FIGS. 4(A) and 4(B). FIG. 8(A) shows an image drawn when the dpi-switching lens unit 9 is retracted from the optical path (resolution: 600 dpi), and FIG. 8(B) shows an image drawing when the dpi-switching lens unit 9 is inserted into the optical path (resolution: 400 dpi). Actually, the image positions in the main scan direction are all the same, but to easily discriminate the lines written by each scan, three lines (indicated by the same reference numbers in FIGS. 8(A) and 8(B) drawn in a single scan are at the same positions in the horizontal direction (main scan direction), and the line drawn in the subsequent scan is shifted slightly to the right. For example, the three lines drawn in the third scan are designated (3) in 8(A) and 8(B). As can be understood from FIGS. 8(A) and 8(B), an image can be drawn without a gap in a single scan because the drawing position is shifted an amount equivalent to three dots at each resolution.

According to construction of the second embodiment described above, the resolution is switched by inserting a dpi-switching lens unit 9 into the optical path before the three laser beams 2 are overlaid, thereby avoiding the disadvantage of increasing the number of parts and complexity of the optical system before beam overlay, simplifying the optical system before said beams are overlaid. Accordingly, relative position precision of the beams is higher. Furthermore, since beam position variation due to manufacturing errors and the like occur simultaneously for each said beam, there is no variation in the relative positions of the three laser beams 2. Therefore, a relatively low accuracy is required of the dpi-switching mechanism comprising unit 9, linear actuator 10 and the like.

Since the optical system using the dpi-switching lens unit 9 is axially symmetrical, rotation adjustment around the optical axis is unnecessary. Furthermore, since only a single lens unit 9 is moved, the moving mechanism is simple compared to zoom variable magnification. Moreover, the absence of zoom magnification allows the number of lenses required in the dpi-switching mechanism to be reduced in practice to two lenses (and theoretically only one). A further advantage is the omission of a mechanism to change the beam diameter as previously mentioned because the beam diameter changes as the spacing changes for the focus position on the surface of photosensitive member 7 via the qualities of the optical system.

As described above, the present invention is capable of switching the spacing of a plurality of beams as well as beam diameters with high precision by means of a simple construction wherein an axially symmetric optical system is inserted in the optical path. Therefore, this simple construction realizes a multi-beam laser scanning apparatus capable of switching resolution with a high degree of accuracy regarding the relative positioning of the beams.

What is claimed is:

1. A multi-beam scanning apparatus which forms an image on a scanned surface via a plurality of laser beams, said apparatus comprising:

a light source for emitting a plurality of laser beams;

a modulation device capable of switching respective modulation frequencies of said laser beams;

a deflection device for deflecting said laser beams, said deflection device being capable of switching a scanning cycle of said laser beams;

an axially symmetric optical system for changing distance among said laser beams on a scanned surface relative to a direction perpendicular to both an optical axis of the laser beams and a scanning direction by being inserted into an optical path of said laser beams; and a moving device for inserting said axially symmetric optical system into the optical path.

2. A multi-beam scanning apparatus as claimed in claim 1, wherein said axially symmetric optical system can be provided in said optical path before said beams arrive at said deflection device.

3. A multi-beam scanning apparatus as claimed in claim 1, wherein said axially symmetric optical system can be provided in said optical path before said beams arrive at said deflection device so as to have all said plurality of laser beams enter said axially symmetric optical system when said axially symmetric optical system is provided in said optical path.

4. A multi-beam scanning apparatus as claimed in claim 1, further comprising:

a collimator lens for collimating said laser beams, said collimator lens being provided in the optical path between said light source and said deflection device; and a cylindrical lens to condense said laser beams only in a subscan direction, said cylindrical lens being disposed near said deflection device and in the optical path between said light source and said deflection device.

5. A multi-beam scanning apparatus as claimed in claim 4, wherein an insertion position of said axially symmetric optical system into said optical path is between said collimator lens and said cylindrical lens.

6. A multi-beam scanning apparatus as claimed in claim 1, further comprising:

a condensing lens for condensing said laser beams, said condensing lens being provided in said optical path between said light source and said deflection device; and a cylindrical lens to condense said laser beams only in a subscan direction, said cylindrical lens being disposed near said deflection device and in the optical path between said light source and said deflection device.

7. A multi-beam scanning apparatus as claimed in claim 6, wherein an insertion position of said axially symmetric optical system into said optical path is between said condensing lens and said cylindrical lens.

8. A multi-beam scanning apparatus as claimed in claim 1, wherein said axially symmetric optical system comprises an afocal lens system.

9. A multi-beam scanning apparatus which forms an image on a scanned surface via a plurality of laser beams, said apparatus comprising:

a light source for emitting a plurality of laser beams;

a modulation device capable of switching respective modulation frequencies of said laser beams;

an overlayor which can overlay said laser beams such that the plurality of laser beams emitted from said light source advance through virtually a same optical path so as to converge at positions separated by a predetermined minute spacing in a subscan direction on the scanned surface;

a deflection device to deflect said laser beams, said deflection device being capable of switching a scanning cycle of said laser beams;

an axially symmetric optical system for changing distance among said laser beams on a scanned surface relative to a direction perpendicular to both an optical axis of the laser beams and a scanning direction by being inserted into the optical path of said laser beams; and a moving device for inserting said axially symmetric optical system into the optical path.

10. A multi-beam scanning apparatus as claimed in claim 9, wherein said axially symmetric optical system is provided before said beams arrive at said deflection device.

11. A multi-beam scanning apparatus as claimed in claim 9, wherein said axially symmetric optical system is provided before said beams arrive at said deflection device so as to have all said plurality of laser beams enter said axially symmetric optical system when said axially symmetric optical system is provided in said optical path.

12. A multi-beam scanning apparatus as claimed in claim 9, further comprising;

a condensing lens for condensing said laser beams, said condensing lens being provided in said optical path between said light source and said deflection device; and a cylindrical lens to condense said laser beams only in a subscan direction, said cylindrical lens the disposed near said deflection device in said optical path between said light source and said deflection device.

13. A multi-beam scanning apparatus as claimed in claim 12, wherein an insertion position of said axially symmetric optical system into said optical path is between said condensing lens and said cylindrical lens.

14. A multi-beam scanning apparatus as claimed in claim 12, wherein said axially symmetric optical system comprises one of each of an axially symmetrical convex lens and concave lens as a lens group satisfying the conditional expression below; and the insertion position of said lens group into said optical path is between said condenser lens and said cylindrical lens;

$$t = \frac{x(x+2f1) - \sqrt{(x+2f1)^2 - 4(x+f1)(f1+f2)}}{2(x+f1)}$$

where the following definitions obtain:

$f1$: focal length of No 1 lens from a light source side in the axially symmetric optical system, $f2$: focal length of No 2 lens from the light source side in the axially symmetric optical system, $x$: distance from an anterior principal point of the No 1 lens from the light source side to a natural convergence point of converged light in the axially symmetric optical system, and $t$: distance from a posterior principal point of the No 1 lens from the light source side to the anterior principal point of the No 2 lens in the axially symmetric optical system.

15. A multi-beam scanning apparatus which forms an image on a scanned surface via a plurality of laser beams, comprising:

a light source for emitting a plurality of laser beams;

a deflection device for deflecting said laser beams;

an axially symmetric optical system for changing distance among said laser beams on a scanned surface relative to a direction perpendicular to both an optical axis of the laser beams and a scanning direction by being inserted into an optical path of said laser beams; and a moving device for inserting said axially symmetric optical system into the optical path.

16. A multi-beam scanning apparatus as claimed in claim 15, further comprising:

a collimator lens for collimating said laser beams, said collimator lens being provided in said optical path between said light source and said deflection device; and a cylindrical lens to condense said laser beams only in a subscan direction, said cylindrical lens being disposed near said deflection device in said optical path between said light source and said deflection device.

17. A multi-beam scanning apparatus as claimed in claim 16, wherein an insertion position of said axially symmetric optical system into said optical path is between said collimator lens and said cylindrical lens.

18. A multi-beam scanning apparatus as claimed in claim 15, wherein said axially symmetric optical system constitutes an afocal lens system.

19. A multi-beam scanning apparatus as claimed in claim 15, wherein said axially symmetric optical system is provided before said beams arrive at said deflection device.

20. A multi-beam scanning apparatus which forms an image on a scanned surface via a plurality of laser beams, comprising:

a light source for emitting a plurality of laser beams;

a beam splitter which overlays laser beams such that the plurality of laser beams emitted from said light source advance through virtually a same optical path so as to converge at positions separated by a predetermined minute spacing in a subscan direction on the scanned surface;

a deflection device to deflect said laser beams;

an axially symmetric optical system for changing distance among said laser beams on a scanned surface relative to a direction perpendicular to both an optical axis of the laser beams and a scanning direction by being inserted into the optical path of said laser beams; and a moving device for inserting said axially symmetric optical system into the optical path.

* * * * *

UNITED STATES PATENT AND TRADEMARK OFFICE
CERTIFICATE OF CORRECTION

PATENT NO. : 5,936,755
DATED : August 10, 1999
INVENTOR(S) : Inagaki

It is certified that error appears in the above-identified patent and that said Letters Patent is hereby corrected as shown below:

Column 11, line 42, claim 12, delete "the" and insert --being--.

Signed and Sealed this

Twenty-fifth Day of April, 2000

Attest:

Q. TODD DICKINSON

*Attesting Officer*      *Director of Patents and Trademarks*